(12) United States Patent
Kawane et al.

(10) Patent No.: US 9,291,368 B2
(45) Date of Patent: Mar. 22, 2016

(54) SOLAR HEAT COLLECTING DEVICE

(75) Inventors: Shinichirou Kawane, Tokyo (JP); Jun Yoshida, Tokyo (JP); Munenori Kawamura, Tokyo (JP); Hironobu Ueda, Tokyo (JP)

(73) Assignees: Hitachi, Ltd., Tokyo (JP); Hitachi Plant Mechanics Co., Ltd., Kudamatsu-shi (JP)

( * ) Notice: Subject to any disclaimer, the term of this patent is extended or adjusted under 35 U.S.C. 154(b) by 390 days.

(21) Appl. No.: 13/991,017

(22) PCT Filed: Nov. 9, 2011

(86) PCT No.: PCT/JP2011/075791
§ 371 (c)(1),
(2), (4) Date: Jul. 31, 2013

(87) PCT Pub. No.: WO2012/073665
PCT Pub. Date: Jun. 7, 2012

(65) Prior Publication Data
US 2013/0298897 A1 Nov. 14, 2013

(30) Foreign Application Priority Data

Dec. 1, 2010 (JP) ................................. 2010-268554
Dec. 1, 2010 (JP) ................................. 2010-268555
Dec. 7, 2010 (JP) ................................. 2010-272325

(51) Int. Cl.
*F24J 2/12* (2006.01)
*F24J 2/38* (2014.01)
(Continued)

(52) U.S. Cl.
CPC .... *F24J 2/38* (2013.01); *F24J 2/14* (2013.01); *F24J 2/16* (2013.01); *F24J 2/18* (2013.01);
(Continued)

(58) Field of Classification Search
CPC .................. F24J 2/38; F24J 2/12; F24J 2/46; G02B 7/183
USPC .......... 126/600, 686, 635, 694; 136/246, 259
See application file for complete search history.

(56) References Cited

U.S. PATENT DOCUMENTS 6,276,359 B1 8/2001 Frazier
8,689,393 B2 * 4/2014 Ota ............................. 15/312.1
(Continued)

FOREIGN PATENT DOCUMENTS

ES EP 2048455 A2 * 4/2009 ................. F24J 2/46
JP 6-313629 11/1994
(Continued)

OTHER PUBLICATIONS

JP2008185299A, (Matsushita Elec) of Japan Aug. 2008, English M/c translation.*
(Continued)

*Primary Examiner* — Gregory Huson
*Assistant Examiner* — Nikhil Mashruwala
(74) *Attorney, Agent, or Firm* — Oliff PLC

(57) ABSTRACT

[Problem] To present a solar heat collecting device capable of enhancing the heat collecting efficiency by effectively utilizing the sunlight entering an area near the end part of the reflector at the opposite side of the direction of location of the sun.
[Solving Means] In the solar heat collecting device for collecting the reflected light of sunlight Sb1, Sb2 entering a trough type reflector 1 having a parabolic section to a heat collecting pipe 2 erected at a position of focus of the reflector 1, and transmitting energy to a heat medium passing inside of the heat collecting pipe 2, the solar heat collecting device is installed so that central axis L1 of the reflector 1 may be directed along the north-south axis, and a plane reflector 3 is disposed orthogonally to central axis L1, at the end part of the reflector 1 at the opposite side of the direction of location of the sun.

4 Claims, 4 Drawing Sheets

(51) Int. Cl.
  *G02B 7/183* (2006.01)
  *F24J 2/14* (2006.01)
  *F24J 2/16* (2006.01)
  *F24J 2/18* (2006.01)
  *F24J 2/46* (2006.01)
  *F24J 2/54* (2006.01)

(52) U.S. Cl.
  CPC  *F24J 2/461* (2013.01); *F24J 2/541* (2013.01); *G02B 7/183* (2013.01); *F24J 2002/5493* (2013.01); *Y02E 10/45* (2013.01); *Y02E 10/47* (2013.01)

(56) References Cited

U.S. PATENT DOCUMENTS

| | | | |
|---|---|---|---|
| 2011/0094549 A1* | 4/2011 | Lin | 134/198 |
| 2011/0146660 A1* | 6/2011 | Cho et al. | 126/569 |
| 2011/0206356 A1* | 8/2011 | Chen et al. | 386/356 |
| 2013/0092153 A1* | 4/2013 | O'Donnell | F28G 1/12 |
| | | | 126/600 |
| 2013/0220305 A1* | 8/2013 | von Behrens | 126/600 |
| 2013/0239343 A1* | 9/2013 | Lacalle Bayo | F24J 2/461 |
| | | | 15/77 |
| 2014/0347758 A1* | 11/2014 | Werner | F16C 13/04 |
| | | | 359/876 |

FOREIGN PATENT DOCUMENTS

| | | |
|---|---|---|
| JP | 9-145166 | 6/1997 |
| JP | 2003-534518 | 11/2003 |
| JP | 2004-239603 | 8/2004 |
| JP | 2008-185299 | 8/2008 |
| JP | 2010-58058 | 3/2010 |
| JP | 2010-190565 | 9/2010 |
| WO | WO 96/29745 | 9/1996 |

OTHER PUBLICATIONS

JP 06-313629 A, (Itama Takeshi), of Japan, Nov. 1994, English M/C translation.*

* cited by examiner

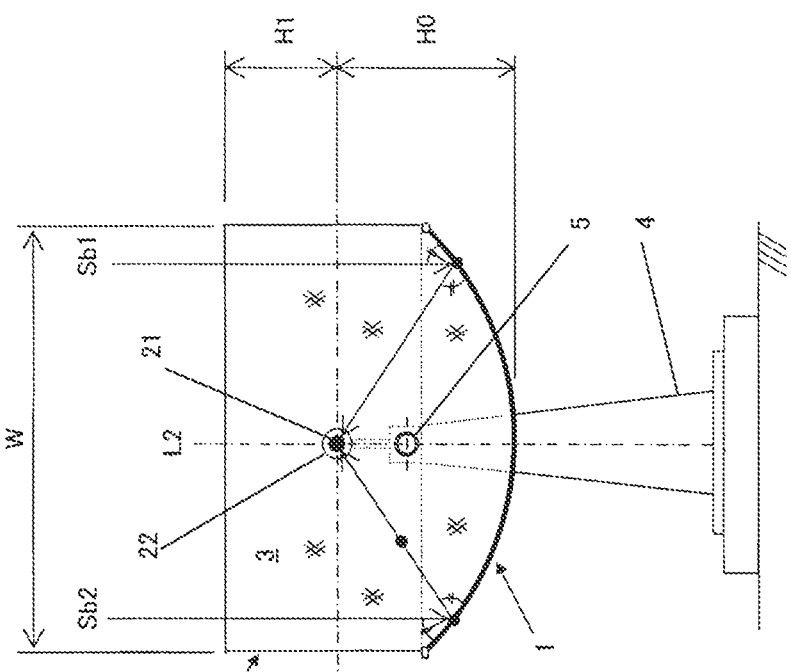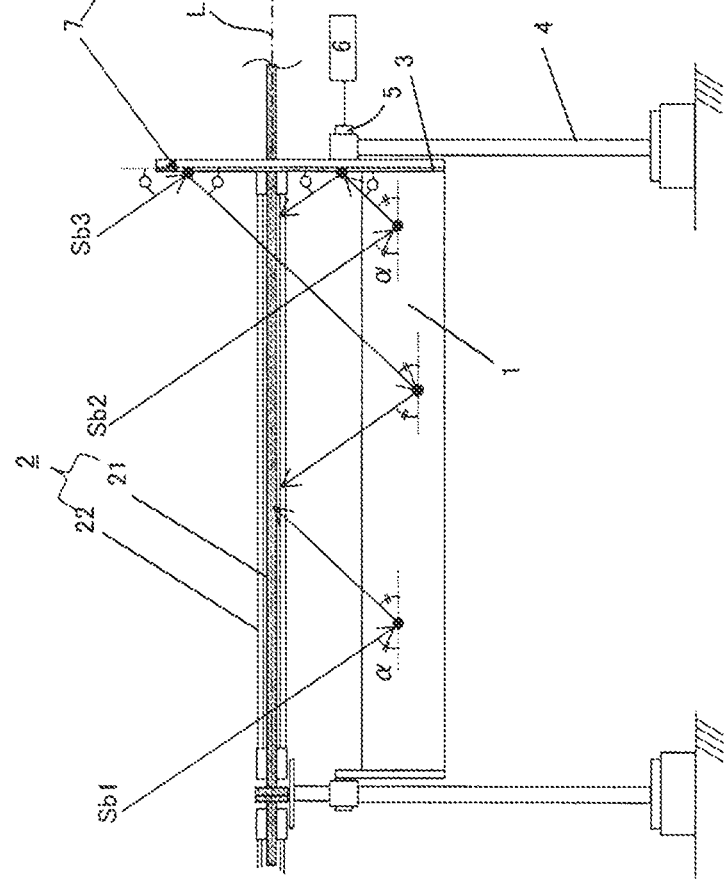
FIG. 1

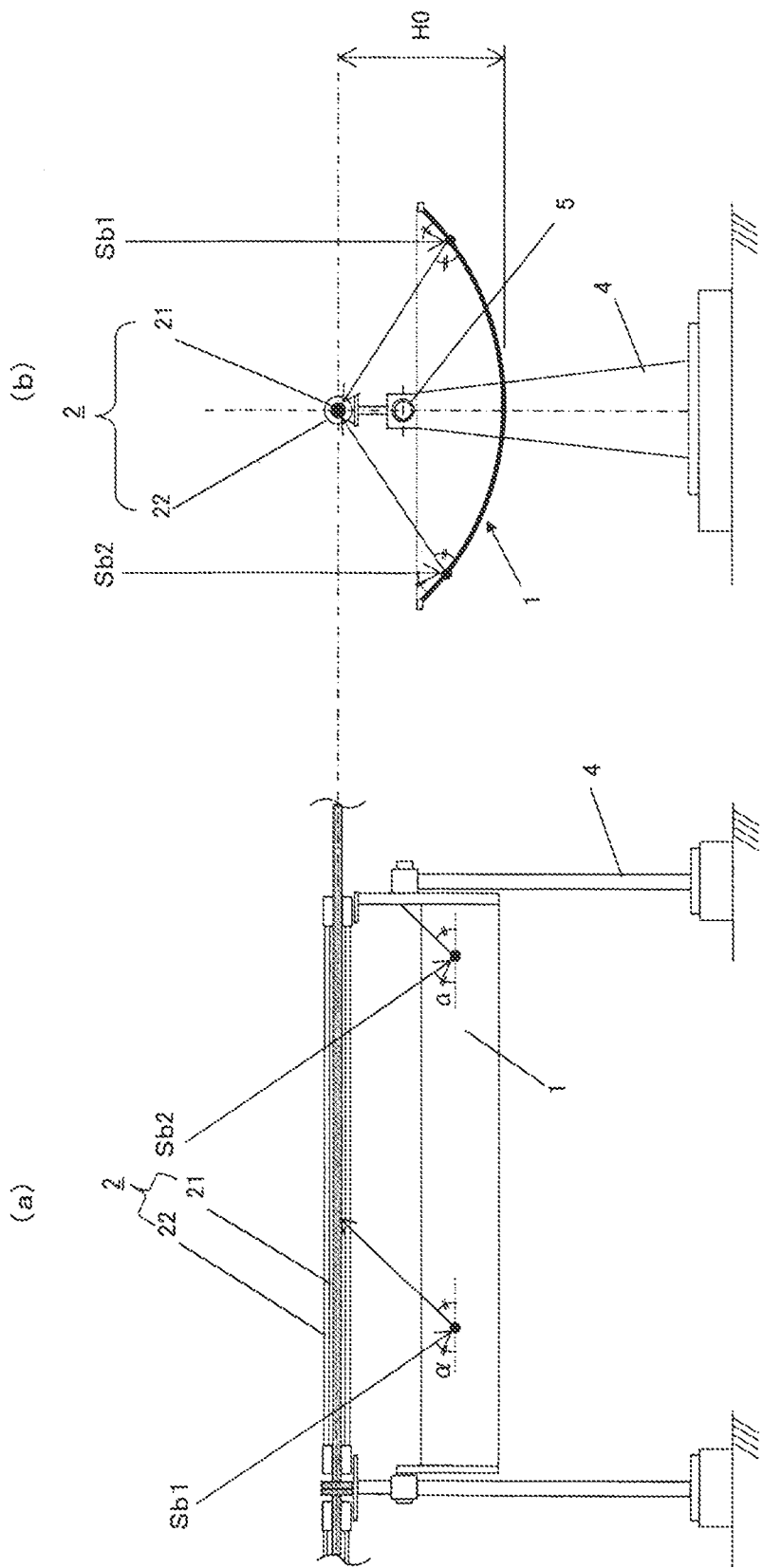

SOLAR HEAT COLLECTING DEVICE

TECHNICAL FIELD

The present invention relates to a solar heat collecting device, more particularly to a solar heat collecting device for collecting sunlight on a heat collecting pipe by a reflector, and transmitting energy to a heat medium passing through the inside of the heat collecting pipe.

BACKGROUND ART

Conventionally, a solar heat collecting device is proposed, which is designed to collect sunlight by a trough type reflector having a parabolic section on a heat collecting pipe, and to transmit energy to a heat medium passing through the inside of the heat collecting pipe (see, for example, patent document 1).

Such conventional solar heat collecting device includes various measures for raising the light collecting efficiency, and for example, the solar heat collecting device of patent document 1 proposes to be provided with a structural element for converging sunlight in the inner tube, in the outer pipe covering the outer circumference of the inner pipe transmitting energy to the heat medium passing through the inside, by forming a heat insulating space.

For example, in a solar heat collecting device of patent document 2, it has been proposed to include a sun tracing mechanism for oscillating an oscillation axis for oscillatably supporting a reflector and a heat collecting pipe so that the reflector may be directed to the direction of the sun.

PRIOR ART LITERATURE

Patent Document

Patent document 1: Japanese Patent Application Laid-Open No. 2004-239603
Patent document 2: International Patent Laid-Open No. 96/29745

SUMMARY OF THE INVENTION

Problems to be Solved by the Invention

In the conventional solar heat collecting device, as shown in FIG. 4, when incident angle a of sunlight Sb1, SB2 to a reflector 1 is small, the reflected light of sunlight Sb2 entering an area near the end part of the reflector 1 at the opposite side of the direction of location of the sun does not reach a heat collecting pipe 2, and in a district of high altitude, in particular, the heat collecting efficiency is lowered.

More specifically, supposing the incident angle of sunlight Sb1, Sb2 to the reflector 1 to be a, and the height from the reflector 1 to the heat collecting pipe to be H0, the distance from the end part of the reflector 1 at the opposite side of the direction of location of the sun is calculated as follows:

$$L = H0/\tan a$$

and hence the reflected light of sunlight Sb2 entering I the range of distance L does not reach up to the heat collecting pipe 2.

Accordingly, this is applied not only to the trough type reflector 1 having a parabolic section, but also to a Fresnel mirror type reflector (not shown) for collecting the reflected light of the sunlight entering each mirror onto the heat collecting pipe, by oscillating and tracing a plurality of long plane division mirrors according to the motion of the sun, and in the case of the Fresnel mirror type reflector which is often set at a high altitude from the reflector to the heat collecting pipe, the effect is significant, and it was a cause of lowering the heat collecting efficiency significantly in the solar heat collecting device shorter in the length in the north-south direction.

The sun tracing mechanism for oscillating the oscillation axis oscillatably supporting the reflector and the heat collecting pipe so that the reflector may be directed to the direction of the sun is generally composed of a motor as a drive mechanism, a rotary encoder for measuring the angle of rotation, a driving force transmission mechanism including a reduction gear having a gear for transmitting the rotation of the motor to the oscillation axis, and a drive control mechanism of the motor, and specifically the sun tracing mechanism includes a backlash in mechanism, and the precision of the angle of rotation of the oscillation axis is out of an ideal range of ±0.2°, which causes to lower the heat collecting efficiency.

In addition, due to the backlash of the sun tracing mechanism, the reflector and the heat collecting pipe may be shaken by wind, which may lead to trouble of the device.

In this type of sun tracing mechanism, various coatings are applied on the reflector, and it is attempted to increase the reflectivity and transmissivity, and to enhance the heat collecting efficiency.

However, if expensive coatings are applied on the reflector in order to increase the reflectivity and transmissivity, on the surface of the reflector which is often installed in a nearly horizontal position, dust is likely to collect, and in particular since the solar heat collecting device is mainly installed in a location of a high annular insolation level, natural cleaning of the reflector and the lenses by rainfall can be hardly expected, and it was required to clean periodically by clean water not containing foreign matter.

In this manner, the solar heat collecting device contributes to conservation of the environment of the earth because natural energy can be utilized effectively, and consumes a huge amount of water for periodic cleaning, and in addition to the problem of the cost, it may be difficult to use in a sun-belt region such as desert area small in water resources.

In the light of the problems of the conventional solar heat collecting device, it is hence a primary object of the present invention to provide a solar heat collecting device capable of enhancing the heat collecting efficiency by effectively utilizing the sunlight entering the region near the end part of the reflector at the opposite side of the direction of location of the sun.

Further, in the light of the problems of the conventional solar heat collecting device, it is also an object of the present invention to provide a solar heat collecting device capable of enhancing the heat collecting efficiency and the durability, by substantially solving the problem of the backlash of the sun tracing mechanism contained in its mechanism.

Moreover, in the light of the problems of the conventional solar heat collecting device, it is also an object of the present invention to provide a solar heat collecting device not requiring periodical cleaning in water, usable in a desert or sun-belt area not enough in water resources, and capable of preventing lowering of reflectivity or transmissivity due to deposit of dust particles on the reflector.

Means for Solving the Problems

To achieve the objects, the solar heat collecting device of the present invention is a solar heat collecting device for collecting the reflected light of sunlight entering a trough type reflector having a parabolic section to a heat collecting pipe erected at a position of focus of the reflector, and transmitting energy to a heat medium passing inside of the heat collecting pipe, in which the solar heat collecting device is installed so that the central axis of the reflector may be directed along the north-south axis, and a plane reflector is disposed orthogonally to the central axis, at the end part of the reflector at the opposite side of the direction of location of the sun.

In this case, in order that the reflector and the heat collecting pipe may be oscillatable on a platform by way of a common oscillation axis, and that the extension direction of a plane including a bisector of the reflector and the heat collecting pipe may be always directed in the direction of the sun, a sun tracing mechanism for rotating the oscillation axis along the motion of the sun is provided, and a weight is added for increasing the weight at one side of an oscillation body composed of the reflector and the heat collecting pipe on both sides of the oscillation axis.

Besides, the oscillation axis may be provided at a position of center of gravity of the oscillation body composed of the reflector and the heat collecting pipe.

The weight may be provided along the edge parallel to the central axis of the reflector.

To achieve the same objects, the solar heat collecting device of the present invention is a solar heat collecting device for collecting the reflected light of sunlight entering a Fresnel mirror type reflector composed of a plurality of long plane division mirrors, to a heat collecting pipe erected at a position of focus of the reflector, and transmitting energy to a heat medium passing inside of the heat collecting pipe, in which the solar heat collecting device is installed so that the central axis of the reflector may be directed along the north-south axis, and a plane reflector is disposed orthogonally to the central axis, at the end part of the reflector at the opposite side of the direction of location of the sun.

In this case, the height of the plane reflector is adjustable.

The plane reflector is also detachable.

Also a high-pressure air injection mechanism can be provided for injecting a high-pressure air for cleaning along the incident plane of sunlight of the reflector.

Along the frame member supporting the incident plane of sunlight of the reflector, pipe members forming multiple nozzles holes for injecting high-pressure air for cleaning of the high-pressure injection mechanism can be disposed.

Moreover, a drive mechanism may be provided for rotating the oscillation axis for oscillating the incident plane of sunlight of the reflector through the oscillation axis on a platform, so that the incident plane may be directed perpendicularly or the incident plane may be directed downward, and a high-pressure air for cleaning is injected from the high-speed air injection mechanism with the incident plane being directed perpendicularly or the incident plane being directed downward.

Effects of the Invention

According to the solar heat collecting device of the present invention, a solar heat collecting device is installed so that the central axis of the reflector may be positioned along the north-south axis of the reflector, and a plane reflector is installed so as to be orthogonal to the central axis, at the end part of the reflector at an opposite side of the direction of location of the sun, and therefore when the incident angle of the sunlight to the reflector is small, the reflected light of the sunlight entering an area near the end part of the reflector at the opposite side of the direction of location of the sun may reflected again by the plane reflector, and collected on the heat collecting pipe, and by utilizing the sunlight entering the reflector effectively, the heat collecting efficiency can be enhanced.

Further, in order that the reflector and the heat collecting pipe may be oscillatable on a platform by way of a common oscillation axis, and that the extension direction of a plane including a bisector of the reflector and the heat collecting pipe may be always directed in the direction of the sun, a sun tracing mechanism for rotating the oscillation axis along the motion of the sun is provided, and a weight is added for increasing the weight at one side of an oscillation body composed of the reflector and the heat collecting pipe on both sides of the oscillation axis, and therefore in a simple mechanism, a torque in one direction may be always applied to the oscillation axis, and the backlash structurally included in the sun tracing mechanism is substantially eliminated, and the angle of rotation of the oscillation axis, that is, the sun tracing precision is enhanced, and the heat collecting efficiency is improved, and it is effective to prevent vibration of the oscillation body composed of the reflector and the heat collecting pipe caused by wind, and to enhance the durability of the device.

The oscillation axis is provided at a position of center of gravity of the oscillation body composed of the reflector and the heat collecting pipe, and therefore it is effective to minimize the driving torque required to oscillate the oscillation axis, that is, the oscillation body composed of the reflector and the heat collecting pipe excluding the weight.

A weight is provided along the edge parallel to the central axis of the reflector, and therefore the weight of a required weight can be provided at a preferred balance.

The plane reflector is provided at an adjustable height, and hence it is possible to adjust the height of the plane reflector according to the incident angle of sunlight into the reflector changing depending on the season, and therefore when a plurality of solar heat collecting devices are installed adjacently to each other along the north-south axis, it is effective to suppress shielding of the sunlight entering the adjacent solar heat collecting device by the plane reflector.

The plane reflector is disposed detachably, and the plane reflector may be detached or attached according to the incident angle of the sunlight into the reflector changing depending on the season, and accordingly, when a plurality of solar heat collecting devices are installed adjacently to each other along the north-south axis, it is effective to suppress shielding of the sunlight entering the adjacent solar heat collecting device by the plane reflector, and also the plane reflector can be installed according to the position of the sun changing depending on the season (the district between the Tropic of Cancer and the Tropic of Capricorn).

A high-pressure air injection mechanism is provided for injecting a high-pressure air for cleaning along the incident plane of sunlight of the reflector, and by injecting a high-pressure air from the high-pressure air injection mechanism along the incident plane of the sunlight of the heat collecting mechanism, dust particles sticking to the incident plane of the sunlight of the heat collecting mechanism can be blown out and cleaned, and periodic cleaning by water is not needed, and it is possible to installed in a desert area or sun-belt region where water resources are not sufficient, and it is effective to prevent decline of reflectivity and transmissivity due to deposit of dust particles on the reflector and the lens of the light collecting mechanism, and the heat collecting efficiency may be maintained at a high level.

Along the frame member supporting the incident plane of sunlight of the reflector, pipe members forming multiple nozzles holes for injecting high-pressure air for cleaning of the high-pressure injection mechanism are disposed, so that the high-pressure air injection mechanism can be installed easily.

Moreover, a drive mechanism is provided for rotating the oscillation axis for oscillating the incident plane of sunlight of the reflector through the oscillation axis on a platform, so that the incident plane may be directed perpendicularly or the incident plane may be directed downward, and a high-pressure air for cleaning is injected from the high-speed air injection mechanism with the incident plane being directed perpendicularly or the incident plane being directed downward, and therefore dust particles sticking to the incident plane of the sunlight of the heat collecting mechanism can be cleaned, and in particular, dew condensation in nighttime can be prevented, and it is effective to prevent sticking of dust particles to the incident plane of the sunlight of the heat collecting mechanism due to dew condensation.

BRIEF DESCRIPTION OF THE DRAWINGS

FIG. 1 shows an embodiment of a solar heat collecting device of the present invention, in which (a) is a front view, and (b) is a side sectional view.

FIG. 4 shows a conventional solar heat collecting device, in which (a) is a front view, and (b) is a side sectional view.

PREFERRED EMBODIMENT

Figure 2:
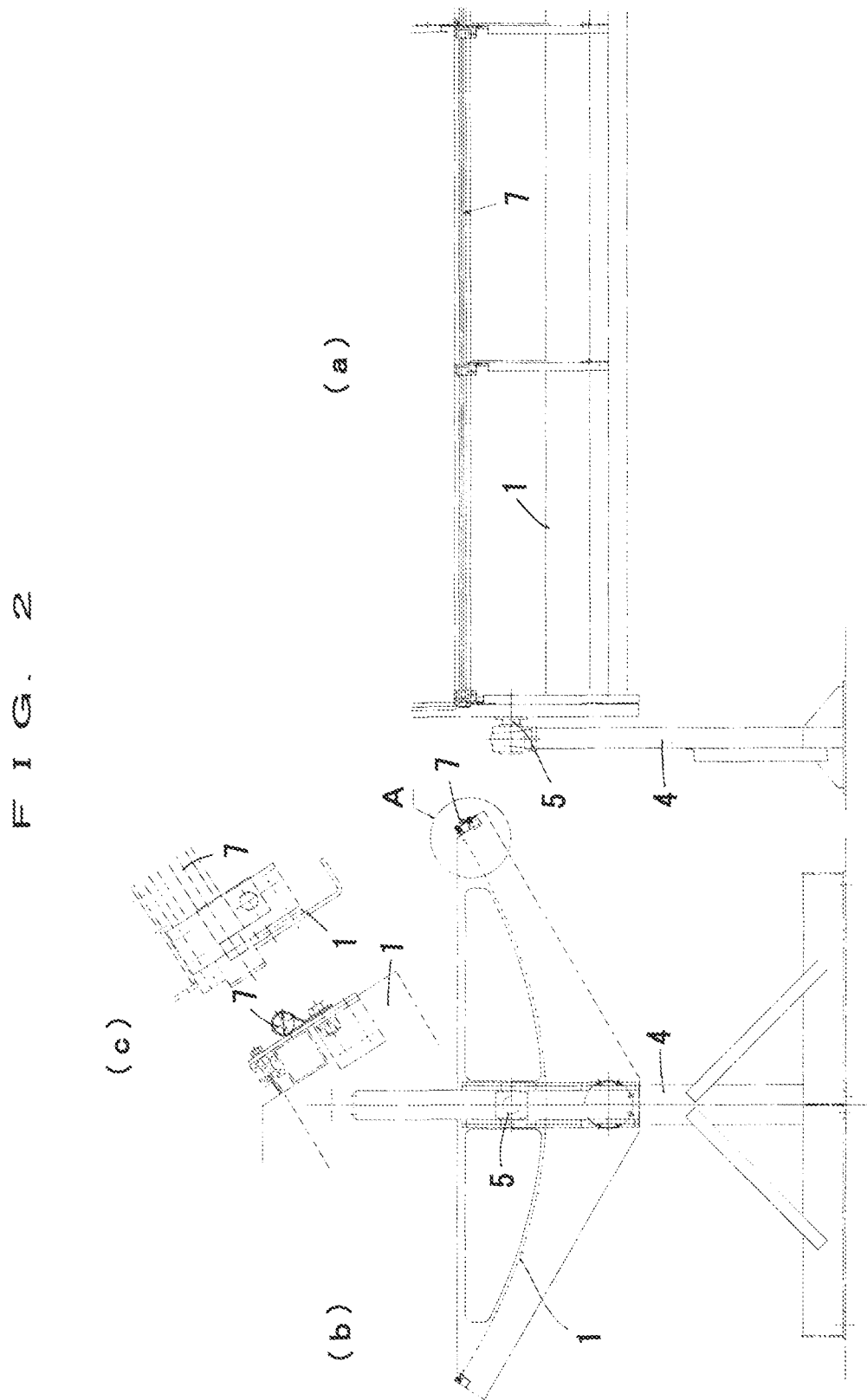
FIG. 2 shows its reflector, in which (a) is a front view, (b) is a side view, and (c) is an enlarged view of part A in (b).

A preferred embodiment of a solar heat collecting device of the present invention is described below while referring to the accompanying drawings.

FIG. 1 shows an embodiment of a solar heat collecting device of the present invention.

This solar heat collecting device is designed to collect the reflected light of sunlight Sb2, Sb2 entering a trough type reflector 1 having a parabolic section, on a heat collecting pipe 2 erected at a position of the focus of the reflector 1, and to transmit energy to a heat medium passing inside of the heat collecting pipe 2.

This solar heat collecting device is a solar heat collecting device installed so that a central axis of the reflector 1 and the heat collecting pipe 2 and the north-south axis may be aligned, in which a plane reflector 3 is disposed orthogonally to the central axis L1 at the end part of the reflector 1 at the opposite side of the direction of location of the sun (at the north side when the sun is positioned in the south, and at the south side when positioned in the north).

In this case, the reflector 1 and the heat collecting pipe 2 are installed on a platform 4 so as to be oscillatable by way of a common oscillation axis 5.

Further, a sun tracing mechanism 6 is provided so as to rotate the oscillation axis 5 along with the motion of the sun, so that the extension direction of the plane including bisector L2 of the reflector 1 and the heat collecting pipe 2 may be always directed in the direction of the sun.

As a result, sunlight Sb1, Sb1 may always enter the reflector 1 in parallel to the plane including bisector L2 of the reflector 1, and the reflected light is collected on central axis L1 of the heat collecting pipe 2 erected at the position of the focus of the reflector 1.

The reflector 1 and the plane reflector 3 are composed of an aluminum plate member as a support member, and an aluminum plate member of high reflectivity as a mirror, which are overlaid, and fitted into a frame member of an aluminum extrusion forming member, but it may be also formed by using glass mirrors of a thin curved material.

The heat collecting pipe 2 may be composed of an inner pipe 21 for receiving the sunlight collected by the reflector 1 as light collecting mechanism, and transmitting energy to a heat medium passing through the inside, and an outer pipe 22 covering the outer circumference of the inner pipe 21 by forming a heat insulating space.

More specifically, the surface of the inner pipe is coated with a chrome oxide plating layer as a solar heat absorbing film.

The chrome oxide plating layer as the solar heat absorbing film can be formed at low cost, by applying a chrome oxide plating on the surface of the inner pipe 21 formed of a pickled steel pipe.

The material of the solar heat absorbing film 11a and its forming method are not particularly specified, and, for example, the material may include, aside from chrome oxide, nickel and other materials, and the forming method may include, aside from plating process, spraying process, physical vapor deposition (PVD), coating and others, and any other known methods may be included for painting the surface in a black color for enhancing absorption of solar heat, applying an appropriate selective absorption film.

The inner pipe 21 may be made of made of steel pipe, stainless steel pipe, and other metal pipe, and the outer pipe 22 may be made of Kovar glass pipe, borosilicate glass pipe, or the like.

The heat insulating space usually insulates heat by forming a vacuum space between the inner pipe 21 and the outer pipe 22.

The heat medium passing inside of the inner pipe 21 is water, heat medium oil, molten salt, or other heat medium functioning as a heat medium when heated to a temperature of hundreds of degrees centigrade, for example, about 400 deg. C.

In the solar heat collecting device of the embodiment, the plane reflector 3 is disposed orthogonally to the central axis L1 of the reflector 1 and the heat collecting pipe 2, at the end part of the reflector 1 at the opposite end of the direction of location of the sun, and hence when the incident angle a of sunlight Sb1, Sb2 into the reflector 1 is small, the reflected light of sunlight Sb2 entering the area near the end part of the reflector 1 at the opposite side of the direction of location of the sun is reflected again by the plane reflector 3, and collected on the heat collecting pipe 2, and the sunlight entering the reflector 1 can be utilized effectively, and the heat collecting efficiency can be enhanced.

The plane reflector 3 may be sufficient if disposed in a range of height H0 from the reflector 1 to the heat collecting pipe 2 only for achieving the objects, but by disposing in a higher range of height H1, sunlight Sb3 not utilized conventionally may be reflected by the plane reflector 3, and may be reflected again by the reflector 1 and collected on the heat collecting pipe 2, so that the heat collecting efficiency may be further enhanced.

Besides, the plane reflector 3 can be disposed at an adjustable height.

As a result, the height of the plane reflector 3 can be adjusted depending on the incident angle ? of sunlight Sb1, Sb2, Sb3 on the reflector 1 changing depending on the season, and for example, when a plurality of solar heat collecting devices are installed adjacently to each other, it is effective to suppress shielding of sunlight entering the adjacently disposed solar heat collecting devices by the plane reflector 3.

Further, the plane reflector 3 may be detachable.

Hence, the plane reflector 3 may be attached or detached depending on the incident angle a of sunlight Sb1, Sb2, Sb3 on the reflector 1 changing depending on the season, and for example, when a plurality of solar heat collecting devices are installed adjacently to each other along the north-south axis, it is effective to prevent shielding of sunlight entering the adjacently disposed solar heat collecting devices by the plane reflector 3, and also the plane reflector 3 can be installed long the position of the sun changing depending on the season (in the region between the Tropic of Cancer and the Tropic of Capricorn).

Herein, the increment of the heat collecting amount by the plane reflector 3 is verified by calculation as follows.

The plane reflector 3 is disposed in a range of height 0 (m) from the reflector 1 to the heat collecting pipe 2, and supposing the opening width of the reflector 1 to be W (m), the incident angle of sunlight Sb1, Sb2, Sb3 to be a, the isolation intensity to be T0 (W;m$^2$), and the reflectivity of the plane reflector 3 to be Γ0, increment Q0 (W) of the heat collecting amount by the plane reflector 3 is as follows, $$Q0 = \Gamma 0 \times \beta 0 \times L \times W = \Gamma 0 \times \beta 0 \times H0 \times W / \tan a$$

and it is extremely effective when the incident angle ? of sunlight Sb1, Sb1, Sb3 is small, and it further contributes by a linear function of H0.

Further, by disposing the plane reflector 3 in a range of height H1 upward, increment Q1 (W) of the heat collecting amount by the plane reflector 3 (in a range of height H1) is as follows, $$Q1 = \Gamma 0 \times \beta 0 \times H1 \times W$$

In the embodiment, the trough type reflector 1 having a parabolic section is used, but the reflector may be replaced by a Fresnel type reflector formed of a plurality of long plane division mirrors (composed of a plurality of long plane division mirrors so as to oscillate and trace according to the motion of the sun, for collecting the reflected light of the sunlight entering each mirror onto a fixed heat collecting pipe) (not shown), and may be used together with the plane reflector 3, and similar actions and effects as above may be obtained.

In this solar heat collecting device, as shown in FIG. 2, in order that the reflector 1 and the heat collecting pipe 2 may be oscillatable on a platform 4 by way of a common oscillation axis 5, and that the extension direction of a plane including bisector L2 of the reflector 1 and the heat collecting pipe 2 may be always directed in the direction of the sun, a sun tracing mechanism 6 for rotating the oscillation axis 5 along the motion of the sun is provided, and a weight 7 is added for increasing the weight at one side of an oscillation body composed of the reflector 1 and the heat collecting pipe 2 on both sides of the oscillation axis 5.

The sun tracing mechanism 6 for rotating the oscillation axis 5 along with the motion of the sun is composed of a motor as a drive mechanism, a rotary encoder for measuring the angle of rotation, a driving force transmission mechanism including a reduction gear having a gear for transmitting the rotation of the motor to the oscillation axis, and a drive control mechanism of the motor, and in order to save energy consumption of the motor drive control mechanism, it is preferred to rotate the oscillation axis 5 along with the motion of the sun by rotating and driving the motor intermittently (for example, every 1 minute) in an allowable range of the sun tracing precision (specifically in a range of) ±0.5°.

Moreover, the motor drive control mechanism is connected to a computer for receiving the latitude, longitude, and time of the location of installation of the solar heat collecting device, so that the oscillation axis 5 may be rotated according to the motion of the sun by automatic control.

Accordingly, a torque can be always applied in one direction of the oscillation axis 5, and the backlash structurally included in the sun tracing mechanism 6 can be substantially eliminated, and the rotation angle of the oscillation axis 5, that is, the sun tracing precision can be enhanced (specifically the tracing precision I controlled in an ideal range of ±0.2°), and sunlight Sb always enters the reflector 1 in parallel to the plane including bisector L2 of the reflector 1 and the heat collecting pipe 2, and therefore the reflected light can be collected on central line L1 of the heat collecting pipe 2 erected at a position of the focus of the reflector 1, so that the heat collecting efficiency may be enhanced.

In addition, by preventing vibration of the oscillation body composed of the reflector 1 and the heat collecting pipe 2 due to wind, the durability of the device can be enhanced.

Preferably, the oscillation axis 5 is disposed at a position of center of gravity of the oscillation body composed of the reflector 1 and the heat collecting pipe 2.

As a result, it is effective to minimize the drive torque necessary for oscillating the oscillation axis 5, that is, the oscillation body composed of the reflector 1 and the heat collecting pipe 2 excluding the weight 7.

The weight 7 may be provided at an arbitrary position of the oscillation body composed of the reflector 1 and the heat collecting pipe 2, excluding on bisector L2 of the reflector 1 and the heat collecting pipe 2, but in the embodiment it is provided along the edge parallel to central axis L1 of the reflector 1.

As a result, the weight 7 can be provided in a well-balanced necessary weight (for example, a proper weight for preventing vibration of the oscillation body composed of the reflector 1 and the heat collecting pipe 2 due to an ordinary weight).

Figure 3:
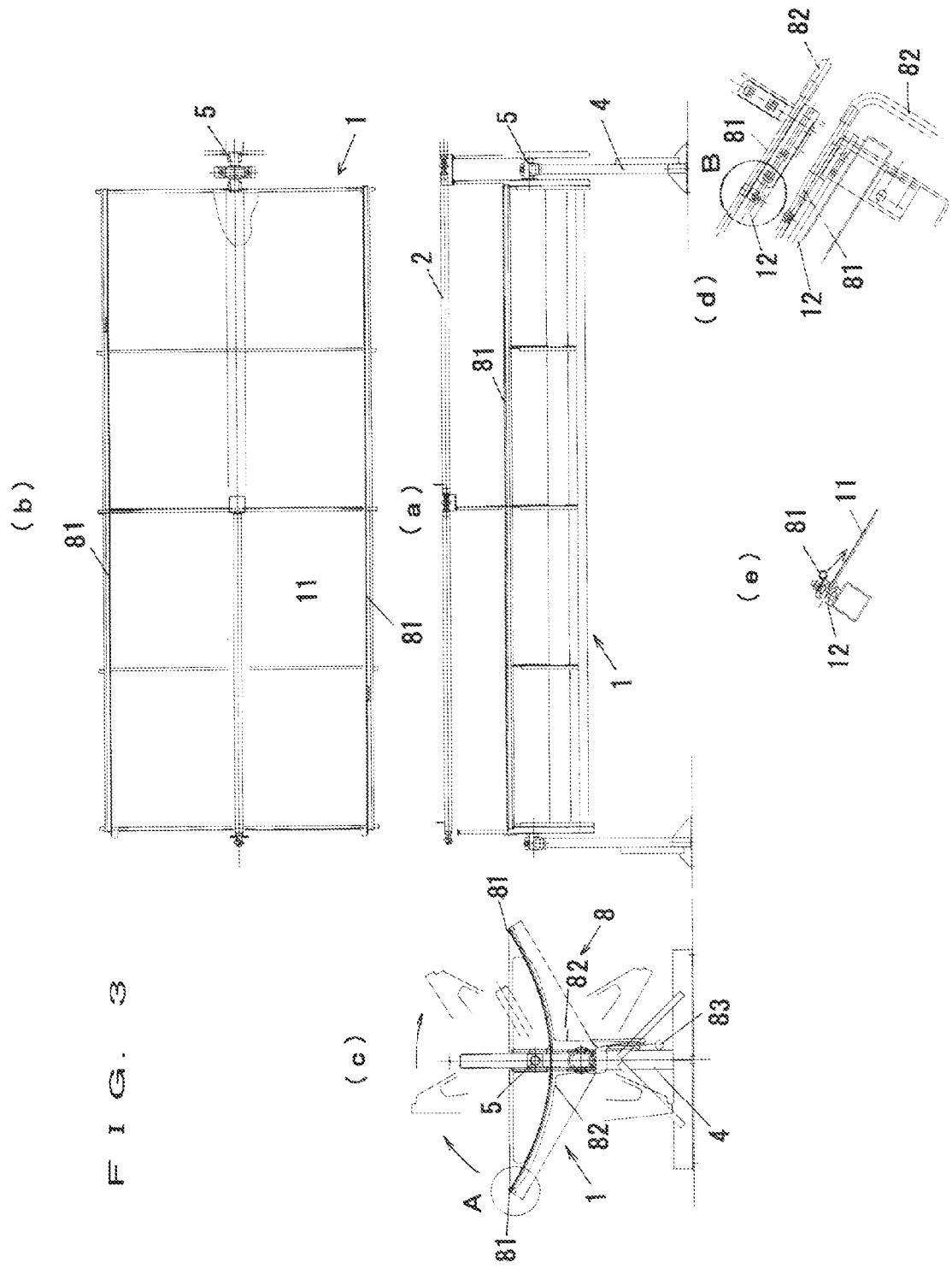
FIG. 3 shows its reflector, in which (a) is a front view, (b) is a plan view, (c) is a side view, (d) is an enlarged view of part A in (c), and (e) is an enlarged view of part B in (d).

Moreover, this solar heat collecting device is provided as shown in FIG. 3, and includes a high-pressure air injection mechanism 8 for injecting a high-pressure air along a mirror surface 11 as the incident plane of the sunlight of the reflector 1.

Hence, by injecting a high-pressure air along a mirror surface 11 as the incident plane of the sunlight of the reflector 1 from the high-pressure air injection mechanism 8, dust deposits sticking to the mirror surface 11 of the reflector 1 can be blown away and cleaned, and periodic cleaning by water is not needed, and it is possible to be used in a desert area or sun-belt district not sufficient in water resources, and lowering of reflectivity due to sticking of dust to the mirror surface 11 of the reflector 1 can be prevented, and the heat collecting efficiency can be maintained in a high state.

In this case, the high-pressure air injection mechanism 8 includes pipe members 81 forming multiple nozzles holes for injecting high-pressure air for cleaning along a frame member 12 supporting the mirror surface 11 of the reflector 1 at equal intervals (for example, intervals of about tens of mm to about 200 mm).

The pipe members 81 are connected to a high-pressure air supply source (not shown) by way of a flexible piping 82 and a piping 83 disposed on the platform 4.

The high-pressure air supply source may be a supply mechanism of arbitrary high-pressure air such as blower or compressor, but may be realized by other mechanism, capable of dehumidifying, and supplying dried high-pressure air, drying the mirror surface 11 of the reflector 1 (for preventing, for example, dew condensation in nighttime), and preventing dust particles from sticking, or capable of supplying ionized high-pressure air, forming an active oxygen (OH radicals, etc.) by the reaction between minus ions and plus ions, and decomposing the contamination sticking to the mirror surface 11 of the reflector 1.

Moreover, as mentioned above, the reflector 1 disposed oscillatably on the platform 4 by way of the oscillation axis 5 may be disposed as shown in FIG. 2 (*c*), in which the mirror the mirror surface 11 as the incident plane of the sunlight of the reflector 1 is rotated so that the perpendicular or incident plane may be directed downward (hence the sun tracing mechanism 6 can be utilized as the drive mechanism), and with the mirror surface 11 disposed so that the perpendicular or incident plane may be directed downward, and high-pressure air for cleaning can be injected from nozzle holes formed in the pipe members 81 of the high-pressure air injection mechanism 8.

As a result, dust particles sticking to the mirror surface 11 of the reflector 1 can be cleaned, and dew condensation in nighttime can be prevented, and sticking of dust particles to the mirror surface 11 of the reflector 1 by dew condensation can be prevented.

The solar heat collecting device of the present invention is described herein on the basis of the embodiment, but the invention is not limited to the illustrated embodiment alone, but may be changed and modified in various forms not departing from the scope of the true spirit thereof.

INDUSTRIAL APPLICABILITY

In the solar heat collecting device of the present invention, the sunlight entering the area near the end part of the reflector at the opposite side of the direction of location of the sun can be utilized effectively, and the heat collecting efficiency can be enhanced, and therefore the heat collecting efficiency of the solar heat collecting device can be enhanced even in a district of a relatively high latitude, and the solar heat collecting device can be utilized in a wide district.

DESCRIPTION OF THE REFERENCE NUMERALS

1 Reflector
2 Heat collecting pipe
21 Inner pipe
22 Outer pipe
3 Plane reflector
7 Weight
8 High-pressure air injection mechanism
81 Pipe member
Sb1 Sunlight
Sb2 Sunlight
Sb3 Sunlight

The invention claimed is:

1. A solar heat collecting device for collecting the reflected light of sunlight entering a trough type reflector having a parabolic section to a heat collecting pipe erected at a position of focus of the reflector, and transmitting energy to a heat medium passing inside of the heat collecting pipe, wherein the solar heat collecting device is installed so that a central axis of the reflector may be directed along the north-south axis, and a plane reflector is disposed orthogonally to the central axis, at the end part of the reflector at the opposite side of the direction of location of the sun,
the solar heat collecting device further comprising a high-pressure air injection mechanism for injecting a high-pressure air for cleaning along the incident plane of sunlight of the reflector, wherein along a frame member supporting the incident plane of sunlight of the reflector, pipe members forming multiple nozzle holes for injecting high-pressure air for cleaning of the high-pressure injection mechanism are disposed.

2. The solar heat collecting device according to claim 1, wherein a drive mechanism is provided for rotating the oscillation axis for oscillating the incident plane of sunlight of the reflector through the oscillation axis on a platform, so that the incident plane may be directed perpendicularly or the incident plane may be directed downward, and a high-pressure air for cleaning is injected from the high-speed air injection mechanism with the incident plane being directed perpendicularly or the incident plane being directed downward.

3. A solar heat collecting device for collecting the reflected light of sunlight entering a Fresnel mirror type reflector composed of a plurality of long plane division mirrors, to a heat collecting pipe erected at a position of focus of the reflector, and transmitting energy to a heat medium passing inside of the heat collecting pipe, wherein the solar heat collecting device is installed so that a central axis of the reflector may be directed along the north-south axis, and a plane reflector is disposed orthogonally to the central axis, at the end part of the reflector at the opposite side of the direction of location of the sun,
the solar heat collecting device further comprising a high-pressure air injection mechanism for injecting a high-pressure air for cleaning along the incident plane of sunlight of the reflector, wherein along a frame member supporting the incident plane of sunlight of the reflector, pipe members forming multiple nozzle holes for injecting high-pressure air for cleaning of the high-pressure injection mechanism are disposed.

4. The solar heat collecting device according to claim 3, wherein a drive mechanism is provided for rotating the oscillation axis for oscillating the incident plane of sunlight of the reflector through the oscillation axis on a platform, so that the incident plane may be directed perpendicularly or the incident plane may be directed downward, and a high-pressure air for cleaning is injected from the high-speed air injection mechanism with the incident plane being directed perpendicularly or the incident plane being directed downward.

* * * * *